US006785033B2

United States Patent
Meyers et al.

(10) Patent No.: US 6,785,033 B2
(45) Date of Patent: Aug. 31, 2004

(54) OPTICAL ATTENUATING DEVICE AND METHOD OF MANUFACTURE THEREFOR

(75) Inventors: Mark M. Meyers, Allentown, PA (US); Daxue Xu, Fogelsville, PA (US)

(73) Assignees: Agere Systems Inc., Allentown, PA (US); TriQuint Technology Holding Inc., Hillsboro, OR (US)

( * ) Notice: Subject to any disclaimer, the term of this patent is extended or adjusted under 35 U.S.C. 154(b) by 115 days.

(21) Appl. No.: 10/087,253

(22) Filed: Mar. 1, 2002

(65) Prior Publication Data

US 2003/0165026 A1 Sep. 4, 2003

(51) Int. Cl.[7] .............. G02F 1/00; G02B 26/00; G02B 6/32; G02B 6/26
(52) U.S. Cl. ............. 359/237; 359/290; 359/291; 385/33; 385/39
(58) Field of Search ................. 359/237, 291, 359/290, 297; 385/39, 33, 23, 36, 161

(56) References Cited

U.S. PATENT DOCUMENTS

| 5,526,172 A | * | 6/1996 | Kanack ............... 359/291 |
| 6,487,342 B1 | * | 11/2002 | Wu et al. ............. 385/39 |
| 2002/0076151 A1 | * | 6/2002 | Kinard et al .......... 385/33 |

* cited by examiner

Primary Examiner—Tim Thompson

(57) ABSTRACT

The present invention provides, in one aspect, an optical device, a method of manufacture therefor, and an optical system including the same. The optical device may include a membrane configured to be electrically deformable and reflective. The membrane may further be positioned over a cavity located within a substrate. The device may additionally include a transmissive spacer coupled to the substrate, and a lens coupled to the transmissive spacer and optically aligned with the membrane.

10 Claims, 8 Drawing Sheets

OPTICAL ATTENUATING DEVICE AND METHOD OF MANUFACTURE THEREFOR

TECHNICAL FIELD OF THE INVENTION

The present invention is directed, in general, to optical devices and, more specifically, to an optical attenuating device, a method of manufacture therefor, and a system including the same.

BACKGROUND OF THE INVENTION

Advances in thin film technology have enabled the development of sophisticated integrated circuits. This advanced semiconductor technology has also been leveraged to create microelectro-mechanical systems (MEMS) structures. Many different varieties of MEMS devices have been created, including micro-sensors, micro-gears and micro-motors. MEMS devices can be employed in a variety of applications, including optical applications that employ MEMS light valves, switches and shutters. MEMS devices have been developed for a wide variety of applications because they provide the advantages of high reliability, extremely small size and applicability to conventional lithographic fabrication techniques.

MEMS structures have also been employed to provide optical attenuation. Optical attenuation can be used to reduce signal power. For instance, attenuation may be required where a signal contains several wavelengths of light and one channel is overpowered to the extent that optical detectors may become saturated. Another example might be an application in which signals originate from several different locations and must be combined together to achieve one or more signals having the same power level. Optical attenuators are also employed for signal gain flattening, such as in dynamic gain equalizers, which can independently address multiple channels of different wavelengths. For example, one or more signals of different wavelengths can be guided into a single fiber such that MEMS optical attenuators integral to the gain equalizer can either address all of the light in that fiber or split the light out into different channels to be independently addressed.

Previous attempts at optical attenuation often employed a lens, a collimator and a reflective membrane deformable in response to an applied voltage. The overpowered signal was guided through the lens, collimated, and reflected off the membrane. Such devices were capable of adequate attenuation performance, however, only at the expense of extensive assembly and alignment obstacles. Misalignment problems generally arise as a result of external hardware and support structure securing the fibers, lens, and membrane in fixed spatial relation to one another. For example, undesirable signal disruption may emanate from (1) misalignment of the input signal fiber with the lens, (2) misalignment of the collimated signal with the membrane, (3) misalignment of the input signal fiber in relation to the output signal fiber, and (4) insertion loss at the fiber/device interfaces.

Attempts to solve this problem involved discrete components with either movable shutter blades, cantilevered mirrors or deformable drumhead membranes with separately aligned lens and discrete fibers. Some improvement materialized with meticulous manual assembly and the advent of automating the assembly of individually constructed units. These attempts, however, failed to completely resolve issues concerning high cost, low throughput, and extensive use of manpower and expensive capital equipment to assemble the device with precise alignment.

Accordingly, what is needed in the art is an optical attenuator device and method of manufacture therefor that avoids the disadvantages associated with the devices currently known in the art.

SUMMARY OF THE INVENTION

To address the above-discussed deficiencies of the prior art, the present invention provides an optical device, a method of manufacture therefor, and an optical system including the same. The optical device may include a membrane configured to be electrically deformable and reflective. The membrane may further be positioned over a cavity located within a substrate. The device may additionally include a transmissive spacer coupled to the substrate, and a lens coupled to the transmissive spacer and optically aligned with the membrane.

The foregoing has outlined preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention.

BRIEF DESCRIPTION OF THE DRAWINGS

The invention is best understood from the following detailed description when read with the accompanying FIGUREs. It is emphasized that, in accordance with the standard practice in the industry, various features are not drawn to scale. In fact, the dimensions of the various features may be arbitrarily increased or decreased for clarity of discussion. Reference is now made to the following descriptions taken in conjunction with the accompanying drawings, in which.

DETAILED DESCRIPTION

Figure 1:
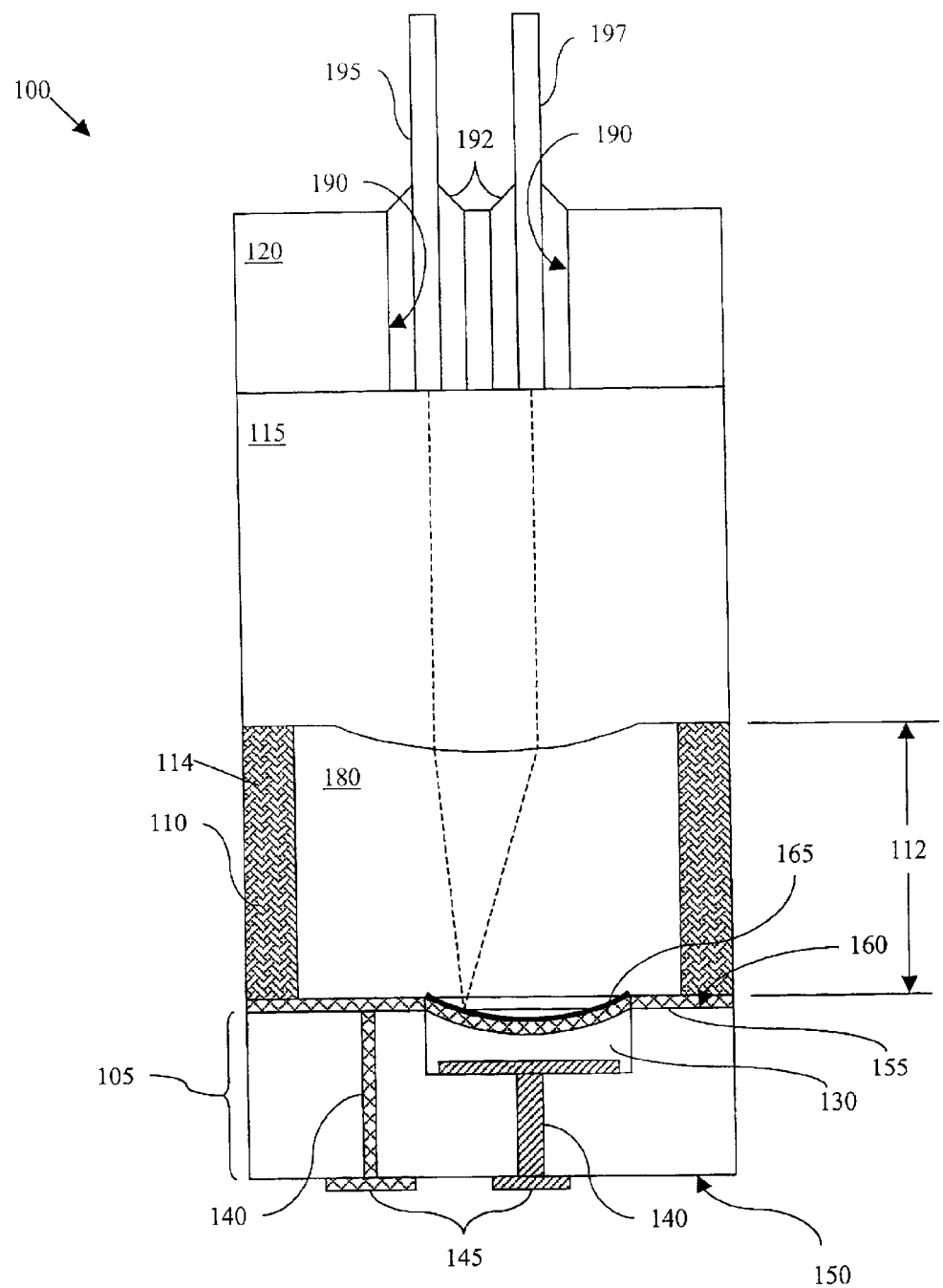
FIG. 1 illustrates an optical attenuator device constructed according to the principles of the present invention.

Referring initially to FIG. 1, illustrated is an optical device, such as optical attenuator device 100, constructed according to the principles of the present invention. In the illustrated embodiment, the optical attenuator device 100 includes a substrate 105, a spacer 110, a lens 115 and a fiber holder 120.

In a preferred embodiment, the substrate 105 may include a cavity 130 formed therein. The substrate 105 further includes one or more electrodes 140 formed therein. In a preferred embodiment, the electrodes 140 are in electrical contact with one or more terminals 145 located on a first surface 150 of the substrate 105. The first surface 150 is preferably on an exterior surface of the device 100.

In the illustrative embodiment shown in FIG. 1, the optical attenuator device 100 further includes a membrane 155 formed over at least a portion of a second surface 160 of the substrate 105. As illustrated, the membrane 155 may be in electrical contact with the terminals 145, the electrodes 140 being used to supply such electrical contact. At least a portion of the membrane 155 is a deformable membrane 165 located over the cavity 130. In a preferred embodiment, the deformable membrane 165 is at least partially reflective. The deformable membrane 165 is deformable in response to electrostatic force provided via the terminals 145 and the electrodes 140. As the amount of deformation of the deformable membrane 165 increases, the amount of attenuation of the incident optical signal (not shown) may also increase. In the illustrated embodiment, the deformable membrane 165 is shown to uniformly deform into the shape of a smoothly contoured arc. However, in other embodiments, the deformable membrane 165 may deform to other shapes, and such deformation may not be uniform or have a smooth contour (see FIGS. 2A, 2B and 3–7).

In the illustrated embodiment, the spacer 110 is coupled to the substrate 105. It is intended that the term coupled may include two items coupled directly to and in contact with one another, as well as two items coupled to but not in direct contact with one another. For example, in the embodiment shown in FIG. 1, the spacer 110 is coupled to the substrate 105; however, the membrane 155 is interposed at least partially there between. Nonetheless, in an alternative embodiment, the spacer 110 may be directly coupled to the substrate 105.

The spacer 110 is preferably transmissive, such that an optical signal may pass there through without substantial distortion. The transmissive nature of the spacer 110 may be achieved by locating a lumen 180, or tunnel, in a central portion of the spacer 110, the lumen 180 comprising air, an inert atmosphere (e.g., nitrogen) or at least a partial vacuum. Thus, the spacer 110 may comprise an annulus structure having a round, rectangular or otherwise shaped cross-section. Those skilled in the art will understand other ways to achieve the transmissive nature of the spacer 110, while staying within the scope of the present invention.

In a preferred embodiment, the spacer 110 may include silicon, ceramic, fused silica or infrared-transparent optical glass, and may have a thickness 112 substantially equal to a focal length of the lens 115, which may be about be about 1 mm. In other embodiments, the spacer 110 may have a thickness 112 ranging from about 1 mm to about 20 mm. The spacer 110 may be coupled to the membrane 155 or substrate 105 with epoxy or solder (not shown) Those skilled in the art will understand that the spacer 110 may be coupled to the membrane 155 or substrate 105 by employing other means within the scope of the present invention.

The lens 115 may be coupled to the spacer 110 with epoxy or solder (not shown). Those skilled in the art will additionally understand that the lens 115 may be coupled to the spacer 110 by employing other well-known means. The lens 115 may be aligned with the spacer 110 and the deformable membrane 165 by several processes. For example, the lens 115 may be formed from a substrate (not shown) having an alignment mark (not shown) which facilitates the accurate alignment of the lens 115 to the spacer 110 and the deformable membrane 165 through conventional alignment techniques. Alternatively, the alignment may be adjusted in response to the measured attenuation of the optical signal passing through the lens 115, as described below.

The fiber holder 120 may be coupled to the lens 115 with epoxy, solder or other well-known means. In the illustrative embodiment shown, the fiber holder 120 includes apertures 190 for securing optical fibers 195, 197 through which an optical input and output signal may propagate. The optical fibers 195, 197 preferably butt against the lens 115. By butting the optical fibers 195, 197 against a substantially flat surface of the lens 115, insertion loss at the fiber-to-lens interface is reduced or, in an advantageous embodiment, substantially eliminated.

In a preferred embodiment, the apertures 190 are larger in diameter than the optical fibers 195, 197, thereby allowing the position of the optical fibers 195, 197 within the apertures 190 to be adjusted to achieve proper alignment with the lens 115 and the deformable membrane 165. The fiber holder 120 may be aligned with the lens 115 and the deformable membrane 165 in a manner similar to the alignment of the lens 115. Once aligned, the optical fibers 195, 197 may be secured to the fiber holder 120 with epoxy or solder 192. In another embodiment, the apertures 190 may be precisely located, such as through conventional photo-lithographic techniques, and may have a diameter substantially similar to the diameter of the optical fibers 195, 197, such that the optical fibers 195, 197 may be secured to the fiber holder 120 by a press fit or interference fit.

During operation of the optical attenuator device 100, an electrical signal is applied to the deformable membrane 165 through a terminal 145 and an electrode 140. In a preferred embodiment, an optical signal transmitted from one optical fiber 195 reflects off of the deformable membrane 165 and back to the other optical fiber 197. When the deformable membrane 165 is not deformed, the optical signal propagates through the optical attenuator device 100 with little attenuation. Specifically, minor coupling losses (less than 1.0 db) may result from the refocusing of the optical signal onto the optical fiber 197, e.g., if the focus size of the optical signal is larger than the working diameter (i.e., the mode field diameter) of the optical fiber 197. Accordingly, deformation of the deformable membrane 165 redirects the incident optical signal at least partially away from a receiving optical fiber 197 such that the optical signal is attenuated, and the optical signal leaving the optical attenuator device 100 is thereby diminished in power compared to the optical signal entering the optical attenuator device 100.

As discussed above, the alignment of the components of the optical attenuator device 100 may be performed by measuring the attenuation of an optical signal leaving the optical attenuator device 100. For example, when aligning the optical fibers 195, 197 with the deformable membrane 165, the deformable membrane 165 may be configured in a pre-determined position (e.g., flat), and the optical fibers 195, 197 may be repositioned such that the optical signal leaving the optical attenuator device 100 is substantially equal in power to the optical signal entering the optical attenuator device 100. The optical fibers 195, 197 may then be secured in place, as described above. In this manner, precise alignment of the entire optical attenuator device 100 may be achieved with minimal procedural steps. This provides an incredible advantage over the prior art structures, in that each individual component of the optical attenuator device 100 does not have to be individually aligned with respect to one another.

Figure 2A:
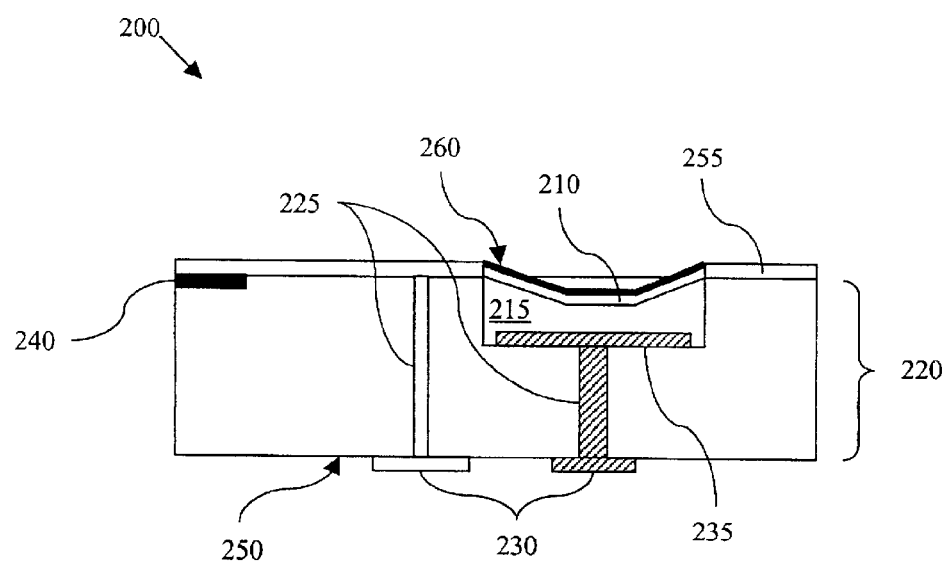
FIG. 2 illustrates an optical attenuator device constructed according to the principles of the present invention in an initial stage of manufacture.

Turning now to FIGS. 2A–5, illustrated are detailed manufacturing steps illustrating how one skilled in the art might manufacture the optical attenuator device 100 illustrated in FIG. 1. FIG. 2A illustrates a partially completed optical attenuator device 200, which is constructed in accordance with the principles of the present invention. In the illustrated embodiment, a deformable membrane 210 is formed over a cavity 215, wherein the cavity 215 is located within a substrate 220.

The substrate 220 may include silicon, and may have a thickness ranging from about 200 µm to about 2000 µm. Alternatively, however, the substrate 220 thickness may range from about 500 µm to about 1200 µm, with a preferred value of about 600 µm or about 1000 µm. Nonetheless, those skilled in the art understand that the substrate 220 may include other materials, such as gallium arsenide, and that the substrate 220 may have various other thicknesses. In one embodiment, the substrate 220 may include at least one alignment mark 240, the purpose of which is described below.

In a preferred embodiment, the cavity 215 may be disc-shaped, and may have a diameter ranging from about 1000 µm to about 2000 µm. However, those skilled in the art understand that the cavity 215 may have other shapes and sizes, including a substantially rectangular shape. Methods of forming the cavity 215 may vary substantially. In one embodiment, however, conventional photolithographic techniques are used to form the cavity 215. While the cavity 215 has presently been shown and discussed as being formed in the substrate 220, one skilled in the art understands it may be formed in any substrate of the optical attenuator device 200, including a substrate at wafer level or above, as discussed below.

Figure 2B:
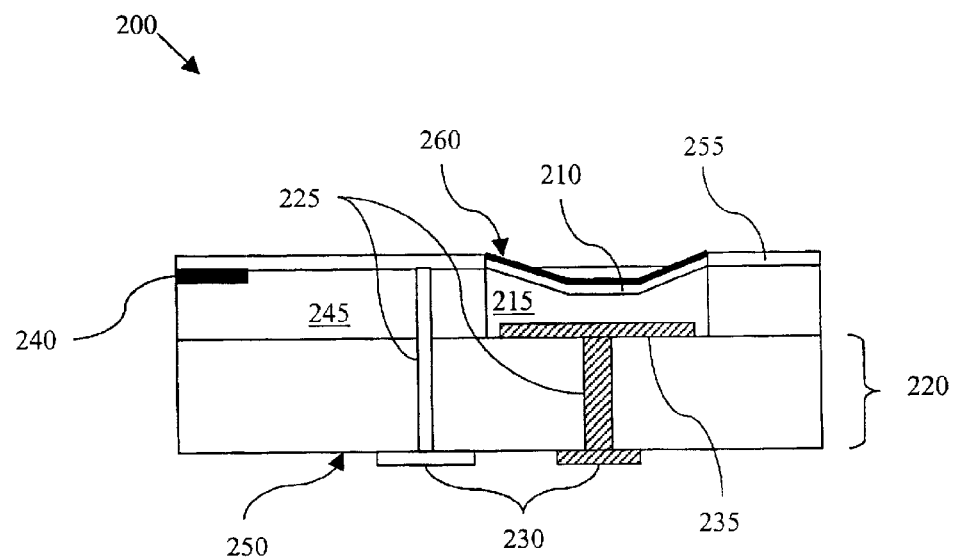

Turning briefly to FIG. 2B, illustrated is an alternative embodiment of the present invention, wherein an oxide layer 245 is formed over the substrate 220, and the cavity 215 is formed in the oxide layer 245. In such an embodiment, the oxide layer might have a thickness ranging from about 1 µm to about 10 µm. If this embodiment were used, the cavity 215 could be formed in the oxide layer 245, using a similar process used to form the cavity 215 in the substrate 220.

Returning to the embodiment of FIG. 2A, the substrate 220 may further include two or more vias 225 formed therein, the vias 225 substantially filled with a conductive material. The vias 225 may be in electrical contact with one or more terminals 230 located on a first surface 250 of the substrate 220. The first surface 250 is preferably on an exterior surface of the optical attenuator device 200. One or more of the vias 225 may be in electrical contact with an electrode 235 that is preferably formed within the cavity 215. Those skilled in the art understand that the vias 225, terminals 230 and electrode 235 may be integrally formed, for example, using conventional lithographic or surface mount techniques.

The deformable membrane 210 may be a portion of a membrane layer 255 formed over the substrate 220. In the illustrative embodiment shown, the membrane layer 255 is conventionally formed over a substantial portion of the substrate 220. The membrane layer 255 may include polysilicon, and may have a thickness ranging from about 1 µm to about 2 µm. However, those skilled in the art understand that the membrane layer 255 may comprise other materials of varying thicknesses, the actual thickness determined by the desired amount of maximum deformation of the deformable membrane 210. The membrane layer 255 may be in electrical contact with the terminals 230.

In one embodiment, at least a portion of the membrane layer 255 includes a metallized layer 260. In a preferred embodiment, the metallized layer 260 is at least over the portion of the membrane layer 255 that forms the deformable membrane 210. The metallized layer 260 renders at least a portion of the membrane layer 260 at least partially reflective.

Figure 3:
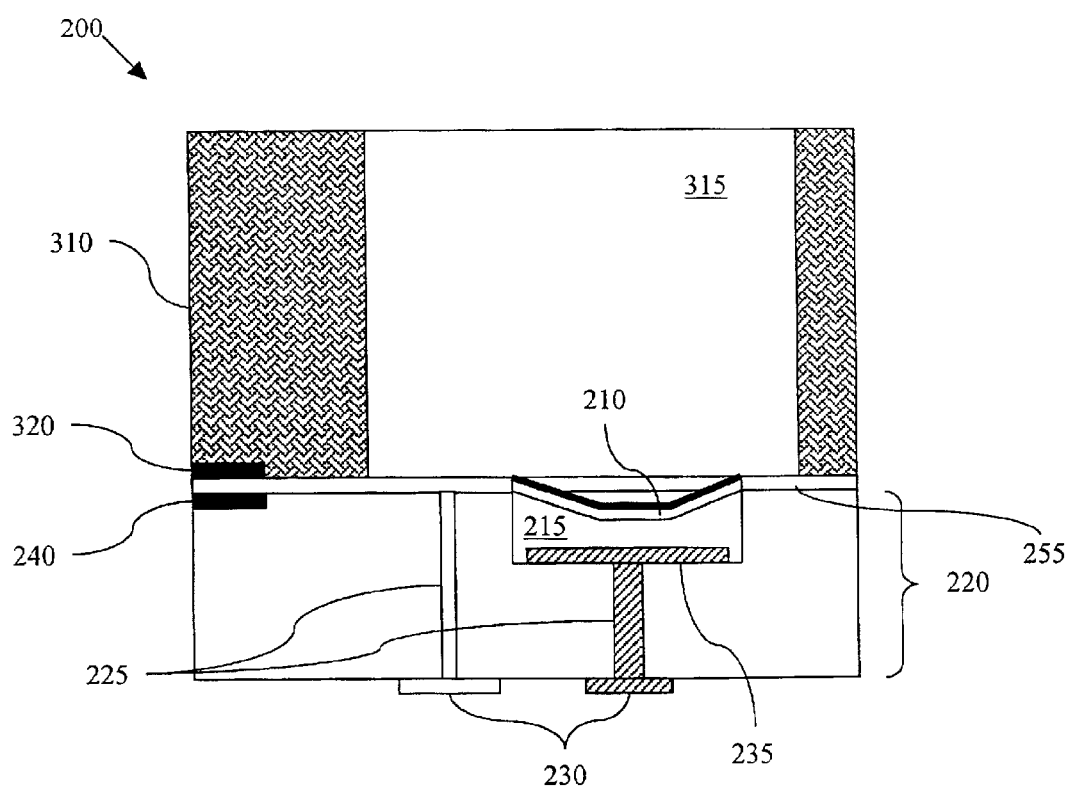
FIG. 3 illustrates the optical attenuator device illustrated in FIG. 2 having a spacer coupled thereto.

Turning to FIG. 3, illustrated is the optical attenuator device 200 shown in FIG. 2A after a spacer 310 has been coupled to the substrate 220 through the use of the membrane layer 255. In an alternative embodiment, however, the spacer 310 may be coupled directly to the substrate 220. The spacer 310 is preferably transmissive, such that an optical signal may pass there through without substantial distortion. The transmissive nature of the spacer 310 may be achieved by locating a lumen 315, or tunnel, in a central portion of the spacer 310, the lumen 315 comprising air, an inert atmosphere (e.g., nitrogen) or at least a partial vacuum. Those skilled in the art understand other ways to achieve the transmissive nature of the spacer 310, while staying within the scope of the present invention.

The spacer 310 may be coupled to the membrane 310 or the substrate 220, depending on the embodiment chosen, with epoxy or solder (not shown). Those skilled in the art will understand that the spacer 310 may be coupled to the membrane 210 or substrate 220 by employing other means within the scope of the present invention. In a preferred embodiment, the spacer 310 may include silicon, ceramic, fused silica or infrared-transparent optical glass, and may be about 1 mm thick. In other embodiments, the spacer 310 may have a thickness ranging from about 1 mm to about 20 mm. In one embodiment, the spacer 310 is formed from a substrate (not shown) having at least one spacer alignment mark 320 thereon. The spacer alignment mark 320 corresponds to the substrate alignment mark 240 to provide alignment of the spacer 310 and the substrate 220. In most instances, these alignment marks are formed in the kerf of "street" of the various substrates, at their outer boundaries, for example. Substrate alignment employing alignment marks is well understood by those skilled in the art.

Figure 4:
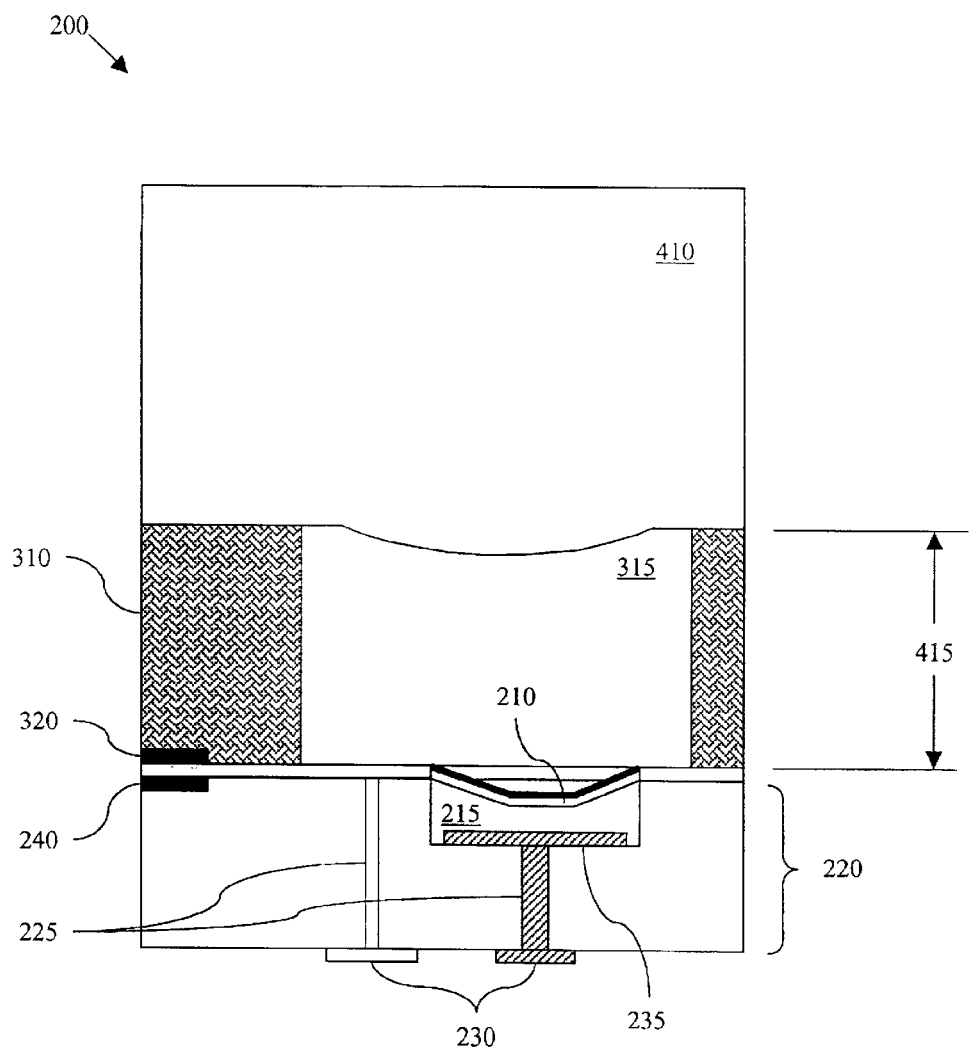
FIG. 4 illustrates the optical attenuator device illustrated in FIG. 3 having a lens coupled thereto.

Turning to FIG. 4, illustrated is the optical attenuator device 200 shown in FIG. 3 after a lens 410 has been coupled to the spacer 310 and optically aligned with the deformable membrane 210. The lens 410 may be coupled to the spacer 310 with epoxy or solder (not shown). Those skilled in the art understand that the lens 410 may be coupled to the spacer 310 by employing other means within the scope of the present invention. In a preferred embodiment, the lens 410 may include fused silica, silicon or optical glass that is infrared transparent, and may be about 1 mm thick. In another embodiment, the lens 410 may have a thickness ranging from about 1 mm to about 5 mm. In another embodiment, a focal length of the lens 410 is about equal to a thickness 415 of the spacer 310.

The lens 410 may be aligned with the spacer 310 and the deformable membrane 210 by several processes. For example, the lens 410 may be formed from a substrate (not shown) having an alignment mark (not shown) which facilitates the accurate alignment of the lens 410 to the spacer 310 and the deformable membrane 210. Alternatively, the alignment may be adjusted in response to the measured attenuation of the optical signal passing through the lens 410, as described above with regard to FIG. 1.

Figure 5:
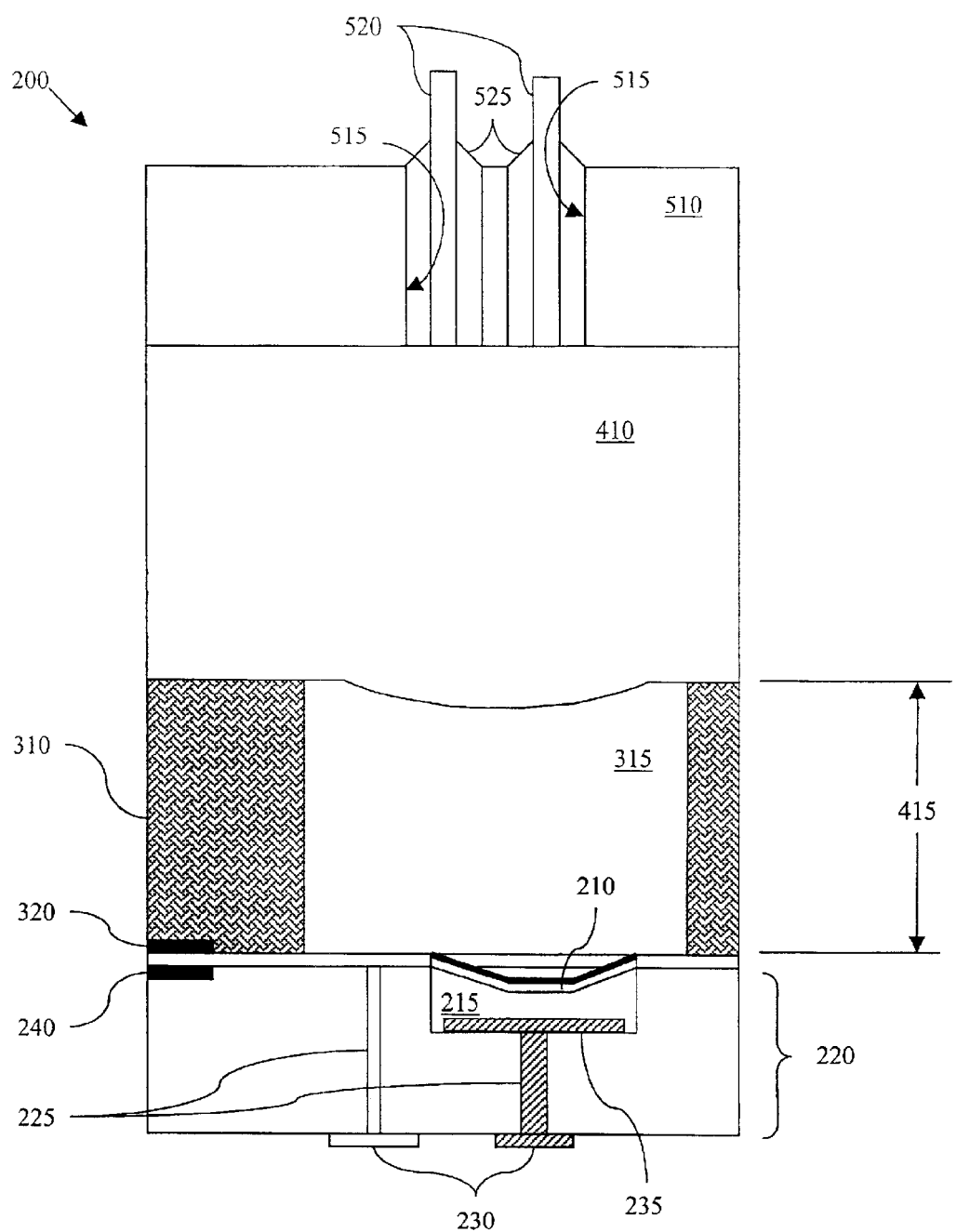
FIG. 5 illustrates the optical attenuator device illustrated in FIG. 4 in a completed stage of manufacture.

Turning to FIG. 5, illustrated is the optical attenuator device 200 shown in FIG. 4 after a fiber holder 510 has been coupled to the lens 410. In a preferred embodiment, the fiber holder 510 includes any material that is solderable and patternable by conventional photo-lithographic techniques, such as silicon, and may be about 1 mm thick. However, in other embodiments the fiber holder 510 may have a thickness ranging from about 1 mm to about 3 mm.

The fiber holder 510 includes apertures 515 for securing optical fibers 520 through which input and output optical signals propagate. The optical fibers 520 preferably butt against the lens 410. In a preferred embodiment, the apertures 515 are larger in diameter than the optical fibers 520, thereby allowing the position of the optical fibers 520 within the apertures 515 to be adjusted to achieve proper alignment with the lens 410 and the deformable membrane 210. The fiber holder 510 may be aligned with the lens 410 and the deformable membrane 210 in a manner similar to the alignment of the lens 410 with the deformable membrane 210. Once aligned, the optical fibers 520 may be secured to the fiber holder 510 with epoxy or solder 525. In another embodiment, the apertures 515 may have a diameter substantially similar to the diameter of the optical fibers 520, such that the optical fibers 520 may be secured to the fiber holder 515 by a press fit or interference fit.

Figure 6:
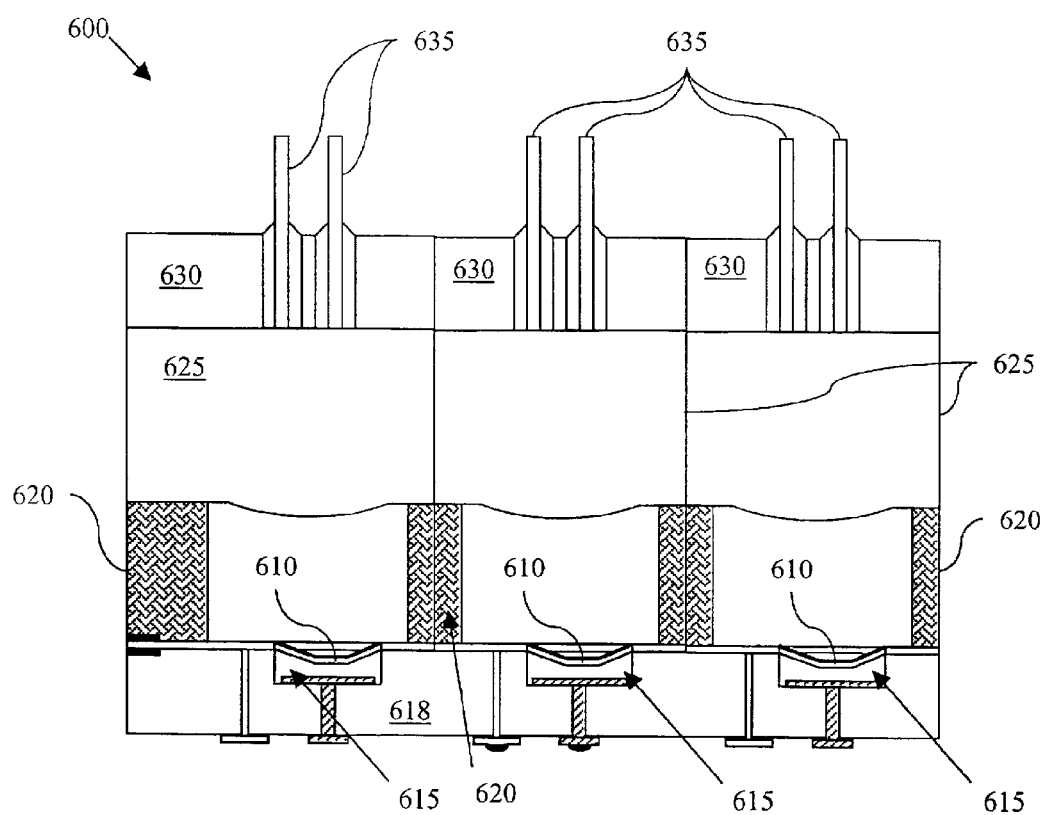
FIG. 6 illustrates an alternative embodiment of the optical attenuator device illustrated in FIG. 1.

Turning to FIG. 6, illustrated is an advantageous embodiment of an optical attenuator array 600, which includes a plurality of devices similar to the optical attenuator device 100 illustrated in FIG. 1. In the advantageous embodiment shown, the optical attenuator array 600 includes a plurality of membranes 610 positioned over a corresponding one of a plurality of cavities 615 located in the substrate 618. The optical attenuator array 600 may further include a transmissive spacer 620 coupled to each of the membranes 610, a lens 625 coupled to each of the transmissive spacers 620, and a fiber holder 630 coupled to each of the lenses 625. The optical attenuator array 600 may further include a plurality of optical fibers 635 coupled to corresponding fiber holders 630. In one embodiment of the invention, the optical attenuator array 600 may be diced or otherwise separated into individual optical attenuator components (not shown) using conventional separation techniques.

Figure 7:
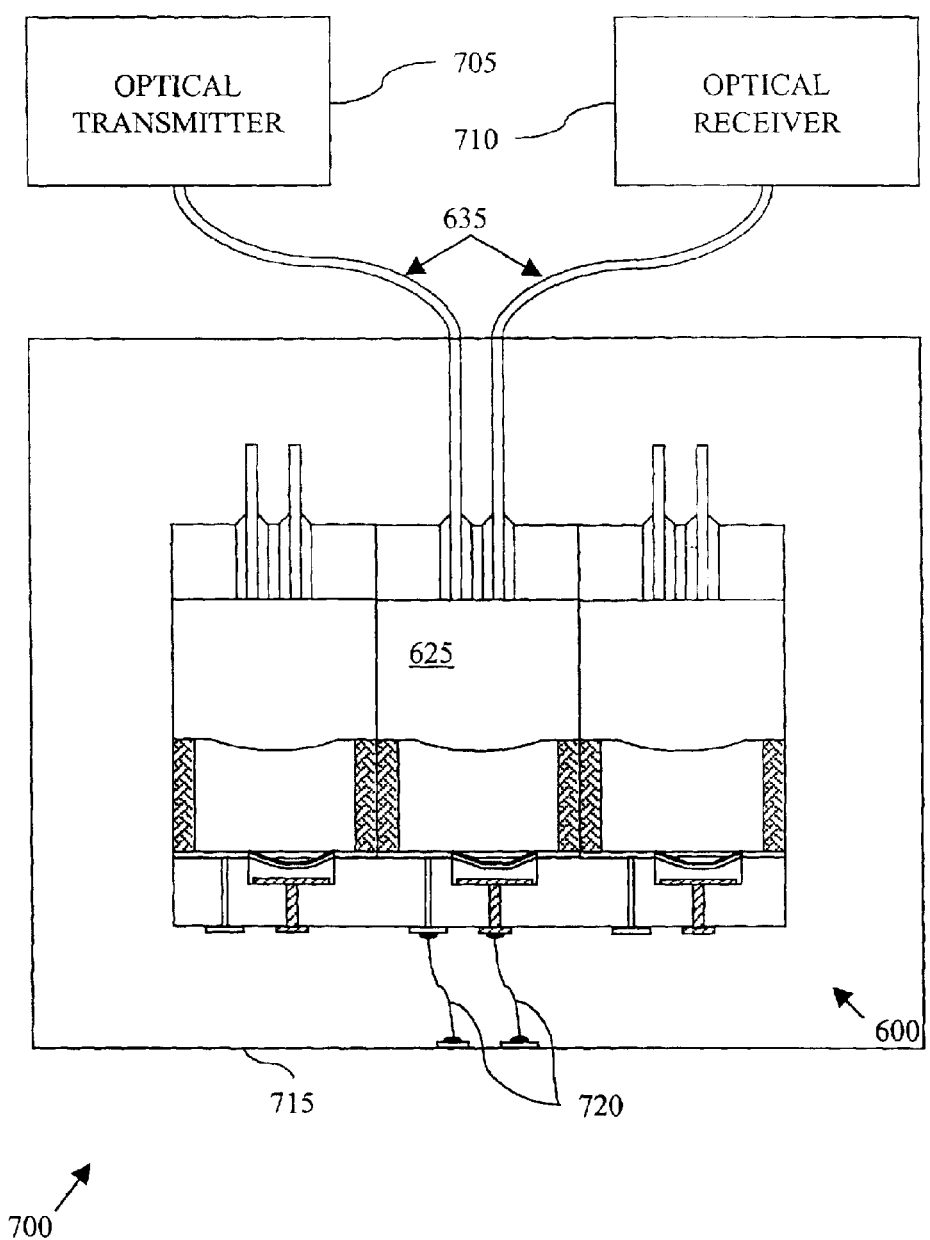
FIG. 7 illustrates an optical system constructed according to the principles of the present invention.

Referring now to FIG. 7, illustrated is an optical system 700 constructed according to the principles of the present invention. The optical system 700 may include a conventional optical transmitter 705, a conventional optical receiver 710 and the optical attenuator array 600 illustrated in FIG. 6. In the illustrated embodiment, an optical switch 715 houses the optical attenuator array 600. However, those skilled in the art understand that the optical attenuator array 600 may be a discrete component of the optical system 700, and may thus be separate from the optical switch 715.

The optical fibers 635 of the optical system 700 couple the optical transmitter 705 and the optical receiver 710 to the optical attenuator array 600. In a preferred embodiment, no connectors are required for the optical transmitter 705 and optical receiver 710 to be connected to and optically communicate with the optical attenuator array 600 and/or the optical switch 715, because, as described above, the optical fibers 635 are directly inserted into the optical attenuator array 600 such that each optical fiber 635 butts against a flat surface of a corresponding lens 625 (FIG. 6).

In the illustrated embodiment, the electrical signal to which the optical attenuator array 600 responds is supplied by the optical switch 715 in the form of an electrical current transmitted by source conductors 720. However, those skilled in the art understand that the electrical signal may also be an electrical voltage, and that the source of the electrical signal may be a component (not shown) other than the optical switch 715.

There are many advantages to the optical attenuator device, system and methods of manufacturing thereof discussed above. For example, the alignment techniques described herein facilitate precise alignment yet require less time and effort than conventional techniques. In addition, the precise alignment can be achieved by manufacturing an entire array of optical attenuator devices simultaneously, each precisely aligned, in lieu of manufacturing individual optical attenuator devices each requiring lengthy, painstaking alignment procedures. By attaching an optical attenuator array, spacer array, lens array and fiber array before dicing, alignment marks can be incorporated to allow the position of all the elements to be established simultaneously with high precision, such that thousands of optical attenuator devices can be simultaneously aligned with the same precision of aligning a single optical attenuator device per the previous devices.

As a corollary to the advantage of precise alignment, another advantage to the embodiments of the present invention is the drastic cost reduction associated with manufacturing each optical attenuator device. As the steps required to manufacture and align the optical attenuator device components decrease in number, the costs of each optical attenuator device will understandably be diminished in comparison to devices constructed per the previous devices.

Further, the embodiments of the present invention may eliminate the need for an external package because the outside of the unit is solid silicon, ceramic and/or fused silica. Thus, the outer periphery of each individual optical attenuator device can act as the device housing, and can be made with metallized terminals to facilitate current surface mount technology, thereby eliminating the need for wire bonding to external circuitry.

Although the present invention has been described in detail, those skilled in the art should understand that they can make various changes, substitutions and alterations herein without departing from the spirit and scope of the invention.

What is claimed is:

1. An optical device, comprising:
    a membrane configured to be electrically deformable and reflective and positioned over a cavity located within a substrate;
    a transmissive spacer coupled to said substrate and located over said cavity; and
    a lens coupled to said transmissive spacer and optically aligned with said membrane, wherein said transmissive spacer has a thickness substantially equal to a focal length of said lens.

2. The optical device as recited in claim 1 further comprising a fiber holder coupled to said lens.

3. The optical device as recited in claim 1 wherein said membrane is located over a first substrate having a first alignment mark and said transmissive spacer is formed from a second substrate having a second alignment mark that corresponds to said first alignment mark to provide alignment of said first substrate with said second substrate.

4. The optical device as recited in claim 1 wherein said transmissive spacer comprises a material selected from the group consisting of:
    silicon;
    ceramic;
    fused silica; and
    infrared-transparent optical glass.

5. The optical device as recited in claim 1 wherein said transmissive spacer forms a lumen between said lens and said membrane and wherein said lumen contains air or an inert atmosphere or wherein at least a partial vacuum exists between said lens and said membrane.

6. The optical device as recited in claim 1 further comprising terminals on an exterior of said optical device and connected to said membrane and configured to provide an electrical current to said membrane.

7. A method of manufacturing an optical device, comprising:

positioning a membrane configured to be electrically deformable and reflective over a cavity located within a substrate;

coupling a transmissive spacer to said substrate such that said transmissive spacer is located over said cavity; and coupling a lens to said transmissive spacer and optically aligned with said membrane, wherein said transmissive spacer has a thickness substantially equal to a focal length of said lens.

8. The method as recited in claim 7 wherein positioning further includes positioning a plurality of said membranes over a corresponding one of a plurality of cavities located in said substrate, and wherein coupling a transmissive spacer further includes coupling a transmissive spacer to each of said membranes, and coupling a lens includes coupling a lens to each of said transmissive spacers, and the method further includes coupling a fiber holder to each of said lenses.

9. The method as recited in claim 7 further comprising coupling a fiber holder to said lens.

10. The method as recited in claim 7 wherein said membrane is formed on a first substrate having a first alignment mark, and said transmissive spacer is formed from a second substrate having a second alignment mark, and wherein coupling said transmissive spacer includes coupling said second substrate to said first substrate by using said first and second alignment marks.

* * * * *